US008191785B2

(12) United States Patent
Qu et al.

(10) Patent No.: US 8,191,785 B2
(45) Date of Patent: Jun. 5, 2012

(54) ENCODED INFORMATION READING TERMINAL OPERATING IN INFRASTRUCTURE MODE AND AD-HOC MODE

(75) Inventors: Huyu Qu, San Jose, CA (US); Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 492 days.

(21) Appl. No.: 12/398,401

(22) Filed: Mar. 5, 2009

(65) Prior Publication Data

US 2010/0226345 A1    Sep. 9, 2010

(51) Int. Cl.
*G06F 19/00* (2011.01)
(52) U.S. Cl. ......... 235/462.15; 235/462.14; 235/462.07; 235/462.1; 235/462.46; 235/472.02; 340/539.11; 340/539.19
(58) Field of Classification Search ............. 235/462.14, 235/462.15; 340/539.11, 539.19
See application file for complete search history.

(56) References Cited

U.S. PATENT DOCUMENTS

| | | | |
|---|---|---|---|
| 5,029,183 A | 7/1991 | Tymes | |
| 5,157,687 A | 10/1992 | Tymes | |
| 5,479,441 A | 12/1995 | Tymes et al. | |
| 5,900,613 A | 5/1999 | Koziol et al. | |
| 5,943,322 A | 8/1999 | Mayor et al. | |
| 6,067,297 A | 5/2000 | Beach | |
| 6,298,176 B2 | 10/2001 | Longacre, Jr. et al. | |
| 6,405,927 B2 | 6/2002 | Sojka et al. | |
| 6,535,493 B1 | 3/2003 | Lee et al. | |
| 6,580,981 B1 | 6/2003 | Masood et al. | |

(Continued)

FOREIGN PATENT DOCUMENTS

EP    1760958    3/2007

(Continued)

OTHER PUBLICATIONS

"Dolphin 9500/9550 Mobile Computer" [Online] Oct. 2003, 2 pages, URL: http://www.rescoelectronics.com/pdfs/9500_9550.pdf> retrieved on Sep. 12, 2008.

(Continued)

*Primary Examiner* — Michael G Lee
*Assistant Examiner* — Kristy A Haupt
(74) *Attorney, Agent, or Firm* — Heslin Rothenberg Farley & Mesiti P.C.

(57) ABSTRACT

An encoded information reading (EIR) terminal can comprise a central processing unit (CPU), a memory communicatively coupled to the CPU, an EIR device, and a wireless communication interface communicatively coupled to the CPU. The EIR device can be selected from the group consisting of a bar code reading device, an RFID reading device, and a card reading device. The EIR device can be configured to perform one of: outputting raw message data containing an encoded message, outputting decoded message data corresponding to an encoded message. The wireless communication interface can comprise a first logical communication interface operating on a first frequency channel and a second logical communication interface operating on a second frequency channel. The wireless communication interface can be configured to transmit infrastructure mode beacons. The infrastructure mode beacons can include a service set identifier. The wireless communication interface can be further configured to transmit ad-hoc mode beacons on the second frequency channel. The ad-hoc mode beacons can include an identifier of a mesh path selection protocol. The EIR terminal can be further configured to route MAC frames between the first logical communication interface and the second logical communication interface.

20 Claims, 9 Drawing Sheets

U.S. PATENT DOCUMENTS

| | | |
|---|---|---|
| 6,617,990 B1 | 9/2003 | Lorenzo-Luaces et al. |
| 6,671,790 B2 | 12/2003 | Gay et al. |
| 6,687,259 B2 | 2/2004 | Alapuranen |
| 6,728,232 B2 | 4/2004 | Hasty, Jr. et al. |
| 6,728,545 B1 | 4/2004 | Belcea |
| 6,754,188 B1 | 6/2004 | Garahi et al. |
| 6,760,444 B1 | 7/2004 | Leung |
| 6,771,666 B2 | 8/2004 | Barker, Jr. |
| 6,799,204 B1 | 9/2004 | Baba et al. |
| 6,804,720 B1 | 10/2004 | Vilander et al. |
| 6,807,165 B2 | 10/2004 | Belcea |
| 6,822,955 B1 | 11/2004 | Brothers et al. |
| 6,845,091 B2 | 1/2005 | Ogier et al. |
| 6,856,624 B2 | 2/2005 | Magret |
| 6,862,274 B1 | 3/2005 | Tsao et al. |
| 6,873,839 B2 | 3/2005 | Stanforth |
| 6,917,605 B2 | 7/2005 | Kakemizu et al. |
| 6,934,274 B2 | 8/2005 | Inoue et al. |
| 6,957,275 B1 | 10/2005 | Sekiguchi et al. |
| 6,963,582 B1 | 11/2005 | Xu |
| 6,965,948 B1 | 11/2005 | Eneborg et al. |
| 6,977,938 B2 | 12/2005 | Alriksson et al. |
| 6,982,967 B1 | 1/2006 | Leung |
| 6,987,743 B2 | 1/2006 | Chen et al. |
| 6,988,146 B1 | 1/2006 | Magret et al. |
| 7,002,932 B1 | 2/2006 | Young et al. |
| 7,009,950 B1 | 3/2006 | Hirata et al. |
| 7,020,120 B2 | 3/2006 | Inoue et al. |
| 7,020,464 B2 | 3/2006 | Bahl et al. |
| 7,032,009 B2 | 4/2006 | Dowling |
| 7,035,932 B1 | 4/2006 | Dowling |
| 7,039,358 B1 | 5/2006 | Shellhammer et al. |
| 7,072,314 B2 | 7/2006 | Saint-Hilaire et al. |
| 7,082,114 B1 | 7/2006 | Engwer et al. |
| 7,088,698 B1 | 8/2006 | Harsch |
| 7,089,313 B2 | 8/2006 | Lee et al. |
| 7,113,599 B2 | 9/2006 | Neves et al. |
| 7,126,945 B2 | 10/2006 | Beach |
| 7,130,614 B2 | 10/2006 | Sreemanthula et al. |
| 7,130,629 B1 | 10/2006 | Leung et al. |
| 7,136,389 B2 | 11/2006 | Shahrier et al. |
| 7,143,171 B2 | 11/2006 | Eriksson et al. |
| 7,146,418 B2 | 12/2006 | Bahl |
| 7,149,229 B1 | 12/2006 | Leung |
| 7,152,238 B1 | 12/2006 | Leung et al. |
| 7,168,090 B2 | 1/2007 | Leung |
| 7,173,917 B1 | 2/2007 | Narayanan et al. |
| 7,188,185 B2 | 3/2007 | Dowling |
| 7,191,226 B2 | 3/2007 | Flykt et al. |
| 7,197,308 B2 | 3/2007 | Singhal et al. |
| 7,197,569 B2 | 3/2007 | Dowling |
| 7,212,505 B2 | 5/2007 | Saint-Hilaire et al. |
| 7,218,634 B1 | 5/2007 | Khalil et al. |
| 7,221,666 B2 | 5/2007 | Inoue et al. |
| 7,228,355 B2 | 6/2007 | Dowling |
| 7,246,373 B1 | 7/2007 | Leung et al. |
| 7,248,572 B2 | 7/2007 | Bender et al. |
| 7,280,495 B1 | 10/2007 | Zweig et al. |
| 7,293,077 B1 | 11/2007 | Teo et al. |
| 7,293,110 B2 | 11/2007 | Dowling |
| 7,299,301 B1 | 11/2007 | Verma et al. |
| 7,315,526 B2 | 1/2008 | Zhang et al. |
| 7,349,377 B2 | 3/2008 | Le et al. |
| 7,349,380 B2 | 3/2008 | Barker, Jr. et al. |
| 7,874,483 B2 * | 1/2011 | Wang et al. .................. 235/439 |
| 2002/0171745 A1 | 11/2002 | Ehrhart |
| 2003/0132292 A1 | 7/2003 | Gomez et al. |
| 2004/0218580 A1 | 11/2004 | Bahl et al. |
| 2005/0063328 A1 | 3/2005 | Dunagan et al. |
| 2005/0272430 A1 | 12/2005 | Griebling |
| 2006/0258322 A1 | 11/2006 | Conner et al. |
| 2006/0268746 A1 | 11/2006 | Wijting et al. |
| 2007/0014269 A1 | 1/2007 | Sherman et al. |
| 2007/0045424 A1 | 3/2007 | Wang |
| 2007/0050523 A1 | 3/2007 | Emeott et al. |
| 2007/0140279 A1 | 6/2007 | Yang et al. |

FOREIGN PATENT DOCUMENTS

| | | |
|---|---|---|
| JP | 2007129690 | 5/2007 |

OTHER PUBLICATIONS

Antonio G. Ruzzelli et al., A Low-Latency Routing Protocol for Wireless Sensor Networks, Adaptive Information Cluster, Smart Media Institute in the Department of Computer Science at University College Dublin, 2003, 6 pgs., Belfield, Dublin.

Atul Adya et al., Architecture and Techniques for Diagnosing Faults in IEEE 802.11 Infrastructure Networks, MobiCom '04 Sep. 26-Oct. 1, 2004, 15 Pgs., Philadelphia, Pennsylvania, USA.

C. Hedrick, Routing Information Protocol, Rutgers University, Jun. 1988, 19 pgs., New Jersey.

Christine E. Jones et al., A Survey of Energy Efficient Network Protocols for Wireless Networks, Wireless Networks 7, 343-358, 2001, Kluwer Academic Publishers, Manufactured in the Netherlands.

Cisco Compatible Extensions for WLAN Devices, Version 2.18, EDCS-262398. 117 pages.

Cisco Compatible Extensions for WLAN Devices, Version 3.0.14, EDCS-334349. 113 pages.

Cisco Compatible Extensions for WLAN Devices, Version 4.0.49, EDCS-383078. 170 pages.

Cisco Systems, Inc., Routing Information Protocol, Internetworking Technologies Handbook, Third Edition, Chapter 47, pp. 1-6., Dec. 1, 2001, Cisco Press, Indianapolis, IN.

D. Franco et al., A New Method to Make Communication Latency Uniform, Distributed Routing Balancing, Unviersitat Autònoma de Barcelona Department d'Informàtica, 1999, 10 pgs., Barcelona, Spain.

Eric Setton et al., Congestion-Optimized Multi-Path Streaming of Video Over Ad Hoc Wireless Networks, Information Systems Laboratory in the Department of Electrical Engineering at Stanford University, 2004, 4 pgs., Stanford, CA.

Eric Setton et al., Minimizing Distortion for Multi-Path Video Streaming Over Ad Hoc Networks, Information Systems Laboratory in the Department of Electrical Engineering at Stanford University, 2004, 4 pgs., Stanford, CA.

Eun-Sun Jung et al., Power Aware Routing Using Power Control in Ad Hoc Networks, Technical Report, Department of Computer Science at Texas A&M University and the Department of Electrical and Computer Engineering and Coordinated Science Laboratory, University of Illinois, Feb. 2005, 8 pgs., College Station, TX and Urbana, IL.

G. Malkin, RIP Version 2, The Internet Society, Nov. 1998, 44 pgs.

Gerald Fry et al., Adaptive Routing of QoS-Constrained Media Streams Over Scalable Overlay Topologies, PowerPoint Slides, Computer Science Dept., Boston University, 2003, 12 pgs., Boston, MA.

Cisco Systems, Inc. IEEE 802.11 Wireless LAN Client, Cisco Systems Compliance Specifications, [Cisco Client Extensions(CCX)] Version 1.23, EDCS-219858. 101 pages.

Information Sciences Institute, University of Southern California, 4676 Admiralty Way, Marina Del Ray, CA 90291, Transmission Control Protocol, DARPA Internet Program Protocol Specification, Sep. 1981. 91 pages.

International Search Report and Written Opinion of the International Searching Authority, International Application No. PCT/US2008/064673, Dated Sep. 30, 2008, 13 pages.

Jangeun Jun, Mihail L. Sichitiu, Department of Electrical and Computer Engineering, North Carolina State University, Raliegh, NC 27695-7911, "MRP: Wireless Mesh Networks Routing Protocol", 34 pages.

Jharna Chokhawala et al., Optimizing Power Aware Routing in Mobile Ad Hoc Networks, Real-Time Systems Laboratory Department of Computer Science at the University of Houston-University Park, May 2004, 4 pgs., Houston, TX.

Jiancong Chen et al., Mixed-Mode WLAN: The Integration of Ad Hoc Mode with Wireless LAN Infrastructure, Department of Computer Science, Electrical & Electronic Engineering at the Hong Kong University of Science and Technology, 2003, 5 pgs., Clear Water Bay, Kowloon, Hong Kong.

Jongman Kim et al., A Low Latency Router Supporting Adaptivity for On-Chip Interconnects, Department of Computer Science and Engineering at Pennsylvania State University, Jun. 2005, 6 pgs., University Park, PA.

Joseph D. Camp, Edward W. Knightly, Electrical and Computer Engineering, Rice University, Houston, TX, "The IEEE 802.11s Extended Service Set Mesh Networking Standard", 6 pages.

Lan Man Standards Committee of the IEEE Computer Society, "Draft Standard for Information Technology—Telecommunications and Information Exchange Between Systems—Local and Metropolitan area Networks—Specific Requirements—Part 11: Wireless LAN Medium Access Control (MAC) and Physical Layer (PHY) Specifications", Reaffirmed by the IEEE-SA Standards Board, Jun. 12, 2003. 530 pages.

Lawrence G. Roberts, The Next Generation of IP—Flow Routing, SSGRR 2003S International Conference, Jul. 29, 2003, 15 pgs., L'Aquila Italy.

Longbi Lin et al., Power Aware Routing for Multi-hop Networks with Energy Replenishment, Purdue School of Electrical and Computer Engineering and the Department of Electrical and Computer Engineering at the University of Illinois at Urbana-Champaign 2004, 6 pgs.

Mike Woo et al., Power-Aware Routing in Mobile Ad Hoc Networks, Department of ECE at Oregon State University and Aerospace Corporation, 1998, 15 pgs., Carvallis, OR and El Segundo, CA.

Network Working Group, C. Perkins, Editor, IBM, Request for Comments: 2002, Category: Standards Track, IP Mobility Support, Oct. 1996. 89 pages.

Network Working Group, C. Perkins, Editor, Nokia Research Center, Request for Comments: 3344, Obsoletes: 3220, Category: Standards Track, IP Mobility Support for IPv4, Aug. 2002. 99 pages.

Network Working Group, Y. Rekhter (Cisco Systems), B. Moskowitz (Chrysler Corp.), D. Karrenberg (RIPE NCC), G. J. de Groot (RIPE NCC), E. Lear (Silicon Graphics, Inc.), Request for Comments, 1918 Obsoletes: 1627, 1597, BCP: 5, Category: Best Current Practice, Feb. 1996. 9 pages.

Paramvir Bahl et al., SSCH: Slotted Seeded Channel Hopping for Capacity Improvement in IEEE 802.11 Ad-Hoc Wireless Networks, MobiCom '04 Sep. 26-Oct. 1, 2004, 15 Pgs., Philadelphia, Pennsylvania, USA.

Prepared by the 802.11 Working Group of the IEEE 802 Committee, IEEE, 3 Park Avenue, New York, New York 10016-5997, "Draft Standard for Information Technology—Telecommunications and Information Exchange Between Systems—Local and Metropolitan area Networks—Specific Requirements—Part 11: Wireless LAN Medium Access Control (MAC) and Physical Layer (PHY) Specifications, Amendment <number>: Mesh Networking" 259 pages, 2007.

Qun Li et al., Online Power-Aware Routing in Wireless Ad-hoc Networks, Department of Computer Science Dartmouth College, 2001, 11 pgs., Hanover, NH.

Ranveer Chandra, MultiNet: Connecting to Multiple IEEE 802.11 Networks Using a Single Radio, Cornell University, Mar. 2004, 13 Pgs., Ithaca, NY.

Ratul K. Guha et al., Fair Coalitions for Power-Aware Routing in Wireless Networks, UEEE Transactions on Mobile Computing Feb. 2007, vol. 6, No. 2, pp. 206-220.

Rob Flickenger, "Building Wireless Community Networks", Planning and Deploying Local Wireless Networks, Second Edition, Chapter three, pp. 19-38 (23 pages).

Sajith Balraj et al., Unicast Routing in Mobile Ad-Hoc Networks, Department of Computer Science and Engineering at the University of Buffalo, 2000, 65 pgs., Buffalo, NY.

Sven Hanemann et al., Reducing Packet Transmission in Ad Hoc Routing Protocols by Adaptive Neighbor Discovery, Department of Mathematics and Computer Science at the University of Marburg, 2003, 7 pgs., Marburg, Germany.

Victor Bahl et al., SSCH: Improving the Capacity of IEEE 802.11 Multihop Networks Using Slotted Seeded Channel Hopping, PowerPoint Slide, Jun. 23, 2004 1 Page.

Yuan Xue et al., A Location-Aided Power-Aware Routing Protocol in Mobile Ad Hoc Networks, Department of Computer Science at the University of Illinois at Urbana-Champaign and the Department of Electrical and Computer Engineering at the University of Toronto, 2001, 5 pgs., Illinois and Toronto, Canada.

* cited by examiner

| ORDER | INFORMATION | NOTES |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM | The TIM information element is only present within Beacon frames generated by APs. |

FIG. 2

| ORDER | INFORMATION | NOTES |
|---|---|---|
| | Mesh ID | The Mesh ID information element may be present within Beacon frames when dot11MeshEnabled is true. |
| | Mesh Configuration | The Mesh Configuration information element may be present within Beacon frames when dot11MeshEnabled is true. |
| | Mesh Neighbor List | The Mesh Neighbor List information element may be present within frames with the DTIM bit set when dot11MeshEnabled is true and the MP transmits to other MPs in power save mode. |
| | Mesh TIM | The Mesh TIM element may be present in Beacon frames generated by the MP when dot11MeshEnabled is true and MP is supporting Transmission to MP in power save mode. |
| | Mesh ATIM Window | The Mesh ATIM window parameter element may be present only when dot11MeshEnabled is true and the MP intends to operate in power save mode. |
| | Beacon Timing | The Beacon Timing information element may be present within Beacon frames when dot11MeshEnabled is true. |
| | MDAOP Advertisements | The MDAOP Advertisements information element may be present within Beacon frames when dot11MeshEnabled is true. |
| | MSCIE | The MSCIE element may be present when dot11MeshEnabled is true. |

FIG. 3

| | ORDER | INFORMATION | NOTES |
|---|---|---|---|
| Normal 802.11 Beacon Frame | 1 | Timestamp | |
| | 2 | Beacon | |
| | 3 | Capability information | |
| | 4 | SSID | The SSID element may be present within beacon frames when is configured as an access point or IBSS no matter dot11MeshEnabled is true or not. Otherwise, the SSID information element is set to the wildcard value. |
| | 5 | Supported rates | |
| | 6 | FH Parameter Set | The FH Parameter Set information element is present within Beacon frames generated by STAs using frequency-hopping PHYs. |
| | 7 | DS Parameter Set | The DS Parameter Set information element is present within Beacon frames generated by STAs using direct sequence PHYs. |
| | 8 | CF Parameter Set | The CF Parameter Set information element is only present within Beacon frames generated by APs supporting a PCF. |
| | 9 | IBSS Parameter Set | The IBSS Parameter Set information element is only present within Beacon frames generated by STAs in an IBSS. |
| | 10 | TIM | The TIM information element is only present within Beacon frames generated by APs. |
| Additional Fields For 802.11s | 25 | Mesh ID | The Mesh ID information element may be present within Beacon frames when dot11MeshEnabled is true. |
| | 26 | Mesh Configuration | The Mesh Configuration information element may be present within Beacon frames when dot11MeshEnabled is true. |
| | 27 | Mesh TIM | The Mesh TIM element may be present in Beacon frames generated by the MP when dot11MeshEnabled is true. |
| | 28 | Awake Window | The Awake window element may be present only when dot11MeshEnabled is true. |
| | 29 | Synchronization Protocol | The Synchronization Protocol information element may be present within Beacon frames when dot11MeshEnabled is true. |
| | 30 | Beacon Timing | The Beacon Timing information element may be present within Beacon frames when dot11MeshEnabled is true. |
| | 31 | MDAOP Advertisements | The MDAOP Advertisements information element may be present within Beacon frames when dot11MeshEnabled is true and the MP supports MDA. |
| | 32 | MSCIE | The MSCIE element may be present when dot11MeshEnabled is true. |

FIG. 4

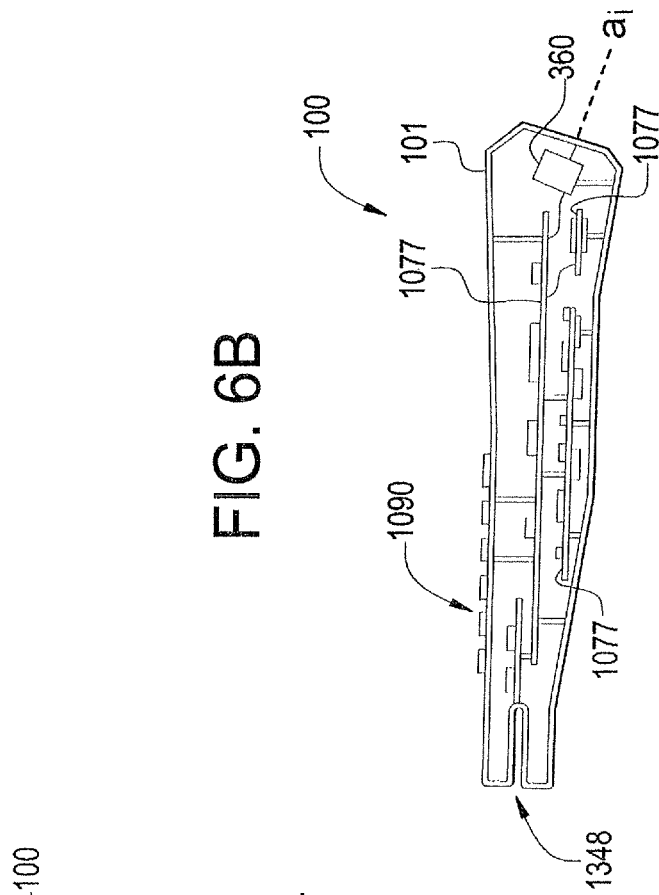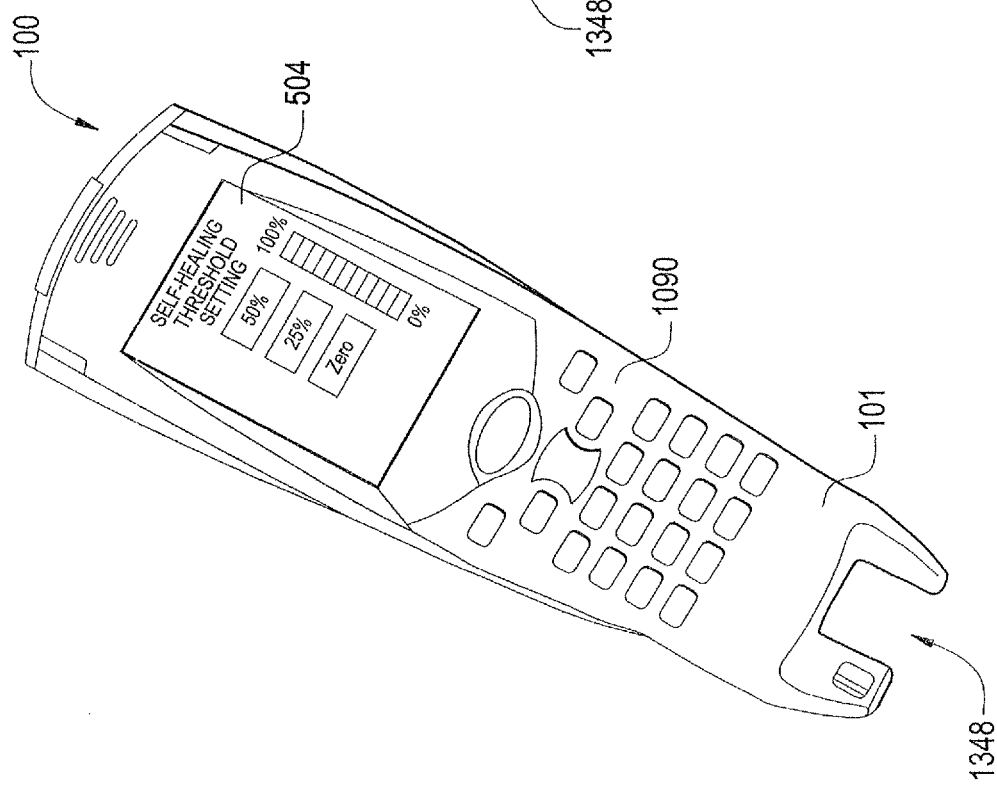

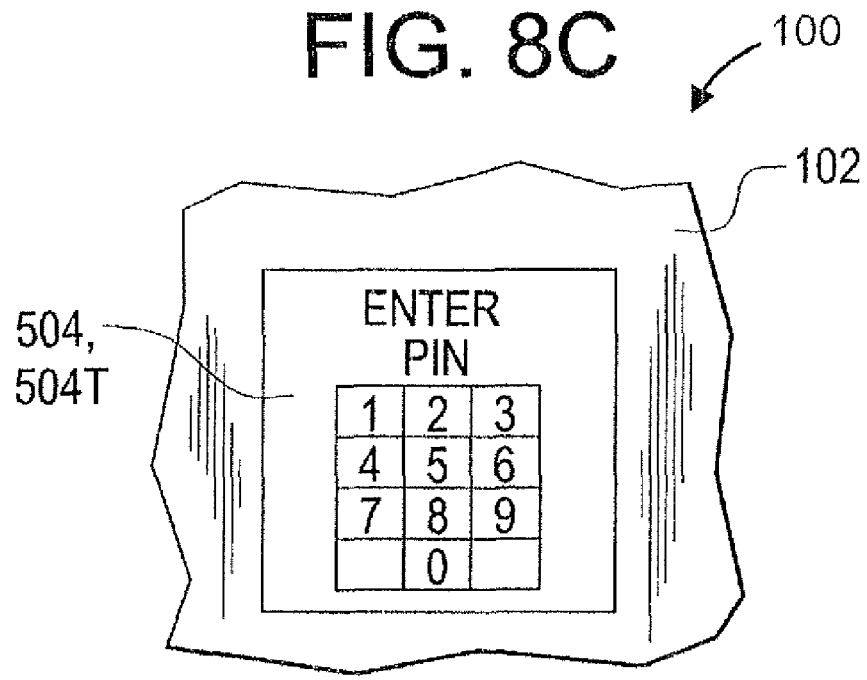
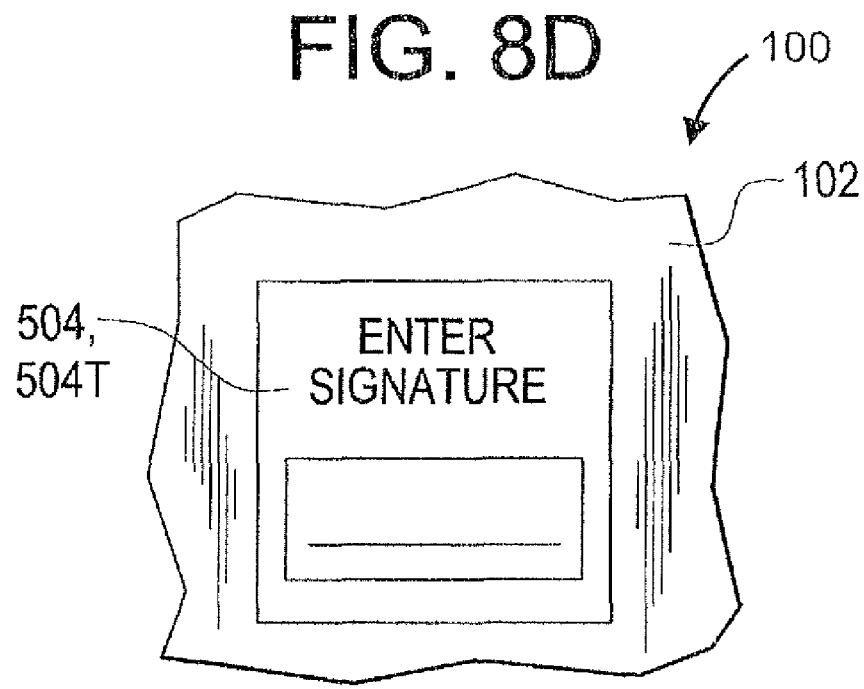

ENCODED INFORMATION READING TERMINAL OPERATING IN INFRASTRUCTURE MODE AND AD-HOC MODE

FIELD OF THE INVENTION

The invention is generally related to data collection systems employing encoded information reading (EIR) terminals and is specifically related to a system and method of wireless data communication in a data collection system employing EIR terminals.

BACKGROUND OF THE INVENTION

Encoded information reading (EIR) terminals equipped with wireless communication interfaces are widely used in retail stores, shipping facilities, etc. While wireless communication of EIR terminals with host computers offer many advantages as compared to wired communications, traditional wireless networks have noticeable shortcomings, including connectivity and network throughput related issues, as well as the high cost of the wireless infrastructure. In an attempt to alleviate the connectivity related issues, the prior art teaches that a wireless device (e.g., an EIR terminal) can operate either in the infrastructure mode (e.g., by acting as a wireless access point (AP), or by associating to a wireless AP), or in the ad-hoc mode (e.g., by establishing one or more links to peer wireless devices). However, an EIR terminal operating in the infrastructure mode is not capable of establishing ad-hoc mode links to peer EIR terminals, nor is an EIR terminal operating in an ad-hoc mode capable of establishing infrastructure mode links to a wireless AP or portal.

Accordingly, there is a need for further advances in EIR terminals and systems which would alleviate the connectivity problems.

SUMMARY OF THE INVENTION

In one embodiment, there is provided an encoded information reading (EIR) terminal comprising a central processing unit (CPU), a memory communicatively coupled to the CPU, an EIR device, and a wireless communication interface communicatively coupled to the CPU. The EIR device can be selected from the group consisting of a bar code reading device, an RFID reading device, and a card reading device. The EIR device can be configured to perform one of: outputting raw message data containing an encoded message, outputting decoded message data corresponding to an encoded message. The wireless communication interface can comprise a first logical communication interface operating on a first frequency channel and a second logical communication interface operating on a second frequency channel. The wireless communication interface can be configured to transmit infrastructure mode beacons. The infrastructure mode beacons can include a service set identifier. The wireless communication interface can be further configured to transmit ad-hoc mode beacons on the second frequency channel. The ad-hoc mode beacons can include an identifier of a mesh path selection protocol. The EIR terminal can be further configured to route medium access control (MAC) frames between the first logical communication interface and the second logical communication interface.

In another embodiment, there is provided an EIR terminal comprising a CPU, a memory communicatively coupled to the CPU, an EIR device, and a wireless communication interface communicatively coupled to the CPU. The EIR device can be selected from the group consisting of a bar code reading device, an RFID reading device, and a card reading device. The EIR device can be configured to perform one of: outputting raw message data including an encoded message, outputting decoded message data corresponding to an encoded message. The wireless communication interface can be configured to transmit beacons which can include a service set identifier and an identifier of a mesh path selection protocol.

In another embodiment, there is provided an EIR terminal comprising a CPU, a memory communicatively coupled to the CPU, an EIR device, and a wireless communication interface communicatively coupled to the CPU. The EIR device can be selected from the group consisting of a bar code reading device, an RFID reading device, and a card reading device. The EIR device can be configured to perform one of: outputting raw message data including an encoded message, outputting decoded message data corresponding to an encoded message. The a wireless communication interface can be configured to communicate using an infrastructure mode to at least one of: a first IEEE 802.11-conformant wireless station, a wireless AP configured to provide distribution services, and a wireless portal configured to provide integration services. The wireless communication interface can be further configured to communicate using an ad-hoc mode to at least one IEEE 802.11-conformant wireless station. The wireless communication interface can be further configured to route MAC frames received from the IEEE 802.11-conformant wireless station to at least one of: a second IEEE 802.11-conformant wireless station, the wireless AP, the wireless portal.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 illustrates an IEEE 802.11 compliant structure of an infrastructure mode beacon frame body;

FIG. 3 illustrates an IEEE 802.11s compliant structure of an ad-hoc mode beacon frame body containing a mesh network identifier;

FIG. 4 illustrates a sample structure of a beacon having both SSID and a mesh identifier according to the invention;

FIGS. 6a and 6b illustrate an exemplary hand held EIR terminal housing;

FIGS. 8c and 8d illustrate PIN and signature data entry operational modes of an EIR terminal according to the invention.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
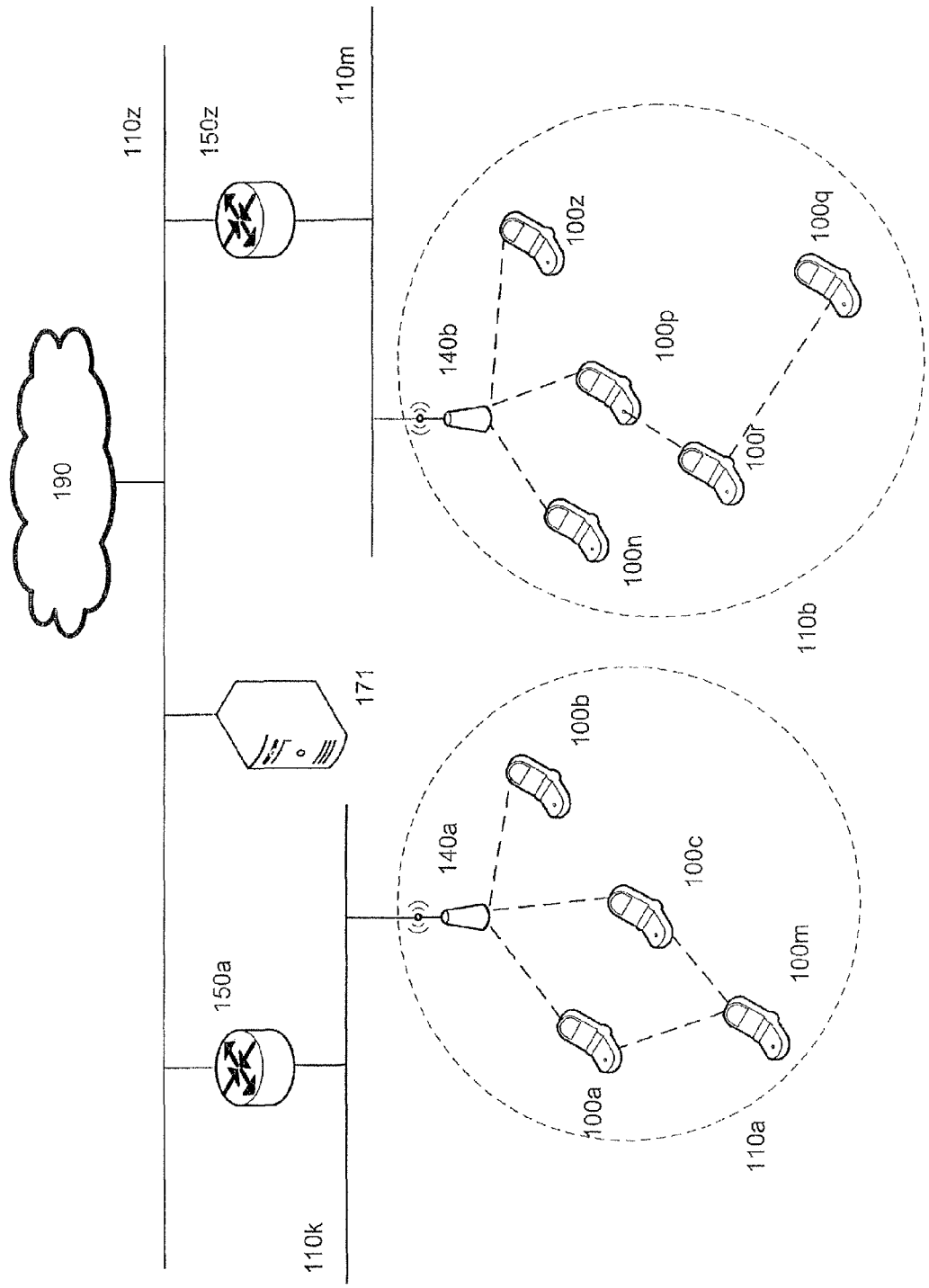
FIG. 1 depicts a network-level view of a data collection system employing EIR terminals according to the invention.

There is provided an encoded information reading (EIR) terminal for incorporation in a data collection system. The data collection system, schematically shown in FIG. 1, can include a plurality of EIR terminals 100a-100z in communication with a plurality of interconnected networks 110a-110z. In one aspect, one of the networks 110a-110z can be connected to the Internet 190. In another aspect, one or more networks of the plurality of networks 110a-110z can act as an Open System Interconnection (OSI) layer 2 network implementing IEEE 802.2 Logical Link Control, i.e., can appear to be functionally equivalent to a broadcast Ethernet-based LAN from the perspective of other networks and higher level protocols. The plurality of networks 110a-110z can include at least one IEEE 802.11-conformant wireless network.

In one aspect, the networks 110a-110z can be interconnected via one or more one or more routers 150a-150z. In another aspect, a router can be provided by a wireless access point (AP) or portal routing datagrams between a wireless and a non-wireless network, e.g., wireless portals 140a, 140b of FIG. 1.

While different networks are designated herein, it is recognized that a single network as seen from the network layer of the OSI model can comprise a plurality of lower layer networks, e.g., what can be regarded as a single Internet Protocol (IP) network, can include a plurality of different physical networks.

In a further aspect, the data collection system can further include a router 150k routing datagrams between the networks 110a-110z and at least one host computer 171. In one embodiment, the host computer 171 can host a retail store inventory database including, e.g., a product information table, a pricing table, and an inventory table. In another embodiment, the host computer 171 can host a shipment database including, e.g., an item tracking table. A skilled artisan would appreciate that other applications running on the host computer are within the scope and spirit of the invention.

In a further aspect, an EIR terminal can comprise a wireless communication interface. The EIR terminal 100c can establish a communication session with the host computer 171. In one embodiment, the communications between the EIR terminal 100c and the host computer 171 can comprise a series of HTTP requests and responses transmitted over one or more TCP connections, although a person skilled in the art would appreciate that using other transport and application level protocols are within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tracking record for an item identified by a bar code label attached to the product.

In another aspect, an EIR terminal can establish one or more wireless links with one or more peer EIR terminals, with a wireless AP, or with a wireless portal.

Under the teachings of the prior art, a wireless device could operate in either infrastructure mode or ad-hoc mode. Ad-hoc mode is a peer-to-peer communication mode of wireless devices (e.g., a 802.11s-compliant mesh mode) which are within the radio communication range of each other. In an IEEE-802.11-compliant embodiment, ad-hoc mode refers to communications within an independent basic service set (IBSS), i.e., within a basic service set (BSS) that forms a self-contained network, and in which no access to a distribution system (DS) is available. IEEE-802.11 defines a wireless station as any wireless device that contains an IEEE 802.11-conformant medium access control (MAC) and physical layer (PHY) interfaces to a wireless medium, and further defines a BSS as a set of wireless stations controlled by a single coordination function (a logical function that determines when a wireless device is permitted to transmit and may be able to receive via the wireless medium). A DS is defined as a system used to interconnect a set of basic service sets (BSSs) and integrated local area networks (LANs) to create an extended service set (ESS), in one embodiment.

Infrastructure mode is a communication mode of wireless devices via a wireless AP or portal. In an IEEE-802.11-compliant embodiment, an AP is a wireless station, and that provides access to distribution services via the wireless medium for associated wireless devices.

In one embodiment of the invention, an EIR terminal can operate in the infrastructure mode and the ad-hoc mode simultaneously. In one aspect, a wireless communication interface of the EIR terminal can communicate using an infrastructure mode to an IEEE 802.11-conformant wireless station (e.g., when the EIR terminal acts as an IEEE-802.11s-compliant mesh access point), a wireless access point, or a wireless portal (e.g., when the EIR terminal acts as an IEEE-802.11-compliant wireless station). In another aspect, a wireless communication interface of the EIR terminal can further communicate using an ad-hoc mode to an IEEE 802.11-conformant wireless station (e.g., using IEEE-802.11s-compliant mesh mode).

In one aspect, the wireless communication interface of an EIR terminal can be capable of operating simultaneously on one or more frequency channels by independently sending and receiving MAC frames on each frequency channel. In an IEEE-802.11-compliant embodiment, a channel is an instance of medium used for the purpose of passing protocol data units that may be used simultaneously, in the same volume of space, with other instances of medium use (on other channels) by other instances of the same physical layer, with an acceptably low frame error ratio due to mutual interference. IEEE-802.11 defines several channels by specifying their center frequencies.

In one embodiment, the EIR terminal can support a logical communication interface which operates using the infrastructure mode and can further support a logical communication interface which operates using the ad-hoc mode. A logical communication interface is an abstract object (e.g., a software object) which has at least some essential properties of a physical communication interface (e.g., a logical communication interface can be assigned a MAC address and/or an IP address), and which is capable of performing at least some essential methods normally associated with a physical communication interface (e.g., sending and receiving data). A logical communication interface can be associated with a physical communication interface.

In one embodiment, the EIR terminal can comprise two or more logical communication interfaces. In another embodiment, the two logical communication interfaces can be provided by a single logical communication interface. In another embodiment, each logical communication interface can be associated with a frequency channel. In another embodiment, two or more logical communication interfaces can operate on a single frequency channel.

In a further aspect, the EIR terminal can route MAC frames received on one frequency channel to a destination which is reachable on another frequency channel. Thus, the EIR terminal can support multiple logical communication interfaces, each logical communication interface being associated with a frequency channel, and the EIR terminal can route MAC frames between the communication interfaces.

In one embodiment, each logical communication interface can be associated with a MAC address, and routing MAC frames between the communication interfaces can be performed at the data link layer, i.e., based on the MAC addresses of the logical communication interfaces. Data link layer routing can be particularly useful, e.g., in non-IP networks.

In another each logical communication interface can be associated with an Internet Protocol (IP) address, and routing MAC frames between the communication interfaces can be performed at the network layer, i.e. based on the IP addresses of the logical communication interfaces. Network layer routing can be particularly useful, e.g., in heterogeneous IP networks.

In a further aspect, the EIR terminal can provide IEEE 802.11-conformant wireless distribution system services, including association, disassociation, distribution, integration, and re-association, to the peer EIR terminals, thus acting as a wireless access point (AP) or a wireless portal. Each of the services is briefly described herein infra.

Association: To deliver a MAC frame within a wireless network, the distribution service needs to know which access point (AP) or portal to access for the given wireless device. This information can be provided by the association service. Before a wireless device is allowed to transmit a MAC frame via an AP or a portal, it shall first become associated with the AP or the portal. At any given time, a wireless device can be associated with no more than one AP or portal. An AP or portal may be associated with many wireless devices at one time.

Disassociation: The disassociation service is invoked whenever an existing association is to be terminated. The disassociation service may be invoked by either party to an association (a wireless device or an AP).

Distribution: Distribution service delivers the MAC frame within a wireless network to the intended recipients.

Integration: If the distribution service determines that the intended recipient of a MAC frame is on a network integrated with the wireless network where the MAC frame originates, the MAC frame will need to be routed via a portal instead of an AP. The integration function is responsible for accomplishing whatever is needed to deliver a MAC frame to the integrated network.

Reassociation: Association is sufficient for no-transition MAC frame delivery between IEEE 802.11 devices. Additional functionality is needed to support device transition mobility. The additional required functionality is provided by the reassociation service which is invoked to "move" a current association from one AP to another.

In another aspect, in addition to data frames that carry information from higher layers, the IEEE-802.11 standard defines network management and control frames. A beacon frame, which is a type of a management frame, provides the "heartbeat" of a wireless LAN, enabling wireless devices to establish and maintain communications. An IEEE-802.11-compliant beacon frame includes a header comprising source and destination MAC addresses (the destination MAC address being the broadcast address), and a body comprising beacon interval, timestamp, parameter sets, and other information.

In one embodiment, the EIR terminal can transmit beacon frames containing a Service Set Identifier (SSID) identifying the respective Basic Service Set (BSS) or Extended Service Set (ESS).

In a further aspect, the EIR terminal can provide IEEE 802.11s-conformant mesh functionality by routing MAC frames received from a peer EIR terminal to another peer EIR terminal, AP or portal, in accordance with a path selection protocol.

In one embodiment, only one path selection protocol can be active at any point in time in a wireless network, to ensure that the most optimal path selection protocol is used for a particular wireless network. The active path selection protocol identifier can be contained within the beacon frames transmitted by a portal, an AP, or a wireless interface module of a peer EIR terminal and received by the wireless interface module of an EIR terminal joining a wireless network.

An EIR terminal according to the invention can transmit on one frequency channel infrastructure mode beacons containing an SSID, and transmit on another frequency channel ad-hoc beacons containing a mesh network identifier or an identifier of a path selection protocol. An IEEE-802.11-compliant structure of an infrastructure mode beacon frame body is shown in FIG. 2, and an IEEE-802.11s-compliant structure of an ad-hoc mode beacon frame body containing a mesh network identifier is shown in FIG. 3.

In another embodiment, an EIR terminal according to the invention can transmit beacons containing both SSID and a mesh network identifier. In another embodiment, an EIR terminal according to the invention can transmit beacons containing both SSID and an identifier of a path selection protocol. A sample structure of a beacon having both SSID and a mesh identifier is shown in FIG. 4.

Examples highlighting the advantages an EIR terminal according to the invention are now being described with references to FIG. 1.

Example 1

An EIR terminal according to the invention can communicate to both wireless AP or portal 140*a* (using the infrastructure mode) and a mesh peer wireless device 100*m* (using the ad-hoc mode) at the same time, thus acting as a mesh portal which can route MAC frames, e.g., between the wireless device 100*c* and other devices within or outside the wireless network 110*b*.

Example 2

An EIR terminal 100*r* can communicate to a mesh peer neighbor 100*p* (using the ad-hoc mode) and a legacy IEEE-802.11-compliant 100*q* (using the infrastructure mode) at the same time, thus acting as a mesh AP which can route MAC frames, e.g., between the wireless device 100*q* and other devices within the wireless network 110*b*.

Figure 5:
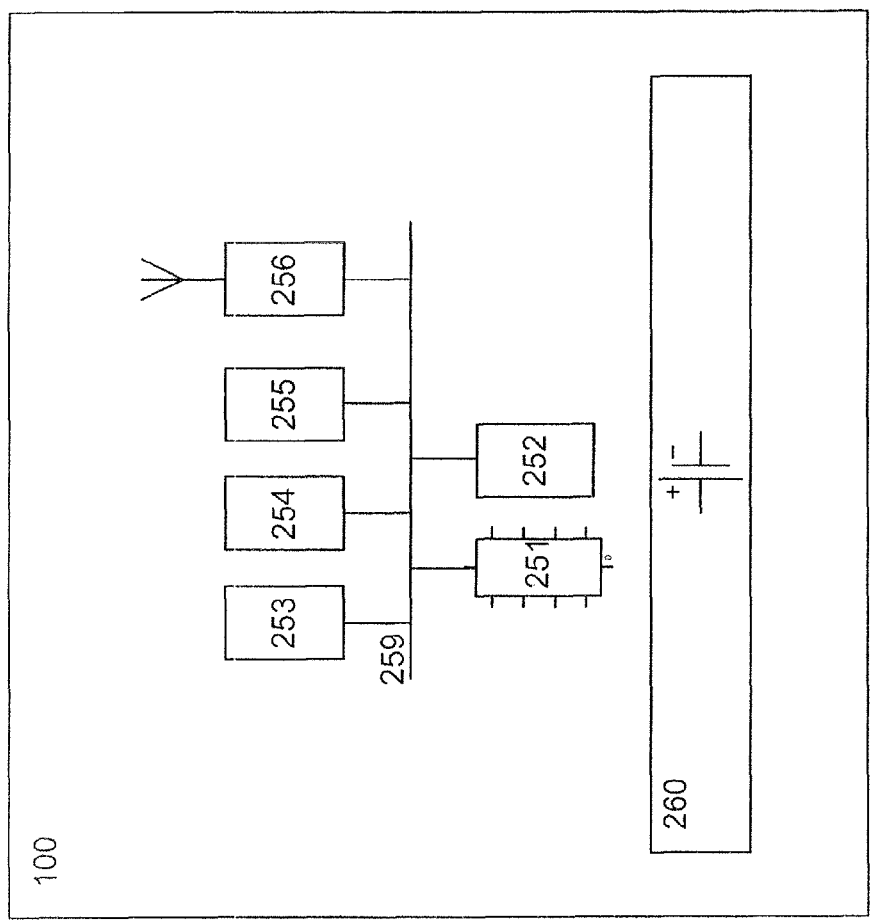
FIG. 5 illustrates a component diagram of an EIR terminal according to the invention.

Now referring to attributes of EIR terminal 100 in further reference to FIG. 5, an EIR terminal 100 according to the invention can comprise a central processing unit (CPU) 251 and a memory 252, both coupled to a system bus 259. In one embodiment, the CPU 251 can be provided by a general purpose microprocessor. The EIR terminal 100 can further comprise one or more encoded information reading (EIR) devices 253, including a bar code reading device, an RFID reading device, and a card reading device, also coupled to the system bus 259. In one embodiment, an EIR reading device can be capable of outputting decoded message data corresponding to an encoded message. In another embodiment, the EIR reading device can output raw message data containing an encoded message, e.g., raw image data or raw RFID data, to be processed by the CPU 251. The EIR terminal module 100 can further comprise a keyboard interface 254 and a display adapter 255, both also coupled to the system bus 259. The EIR terminal 100 can further comprise one or more wireless communication interfaces 256, also coupled to the system bus 259. The EIR terminal 100 can further comprise a battery 260.

Form factors and housings for the EIR terminal according to the invention are now being described. The components of EIR terminal 100 can be incorporated into a variety of different housings. As indicated by the embodiment of FIGS. 6a and 6b, the components of FIG. 5 can be incorporated into a hand held housing 101. EIR terminal 100 of FIGS. 6a and 6b is in the form factor of a hand held portable data terminal. EIR terminal 100 as shown in FIGS. 6a and 6b includes a keyboard 1090, a display 504 having an associated touch screen overlay, a card reader 1348, and an imaging module 360 which includes the components of imaging assembly as described herein; namely, image sensor array incorporated on an image sensor IC chip. Imaging module 360 has an associated imaging axis, $a_i$. As indicated by the side view of FIG. 6b, the components of the block diagram of FIG. 5 may be supported within housing 101 on a plurality of circuit boards 1077. Imaging module 360 may include an image sensor array having color sensitive pixels as described in Provisional Patent Application No. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 7B:
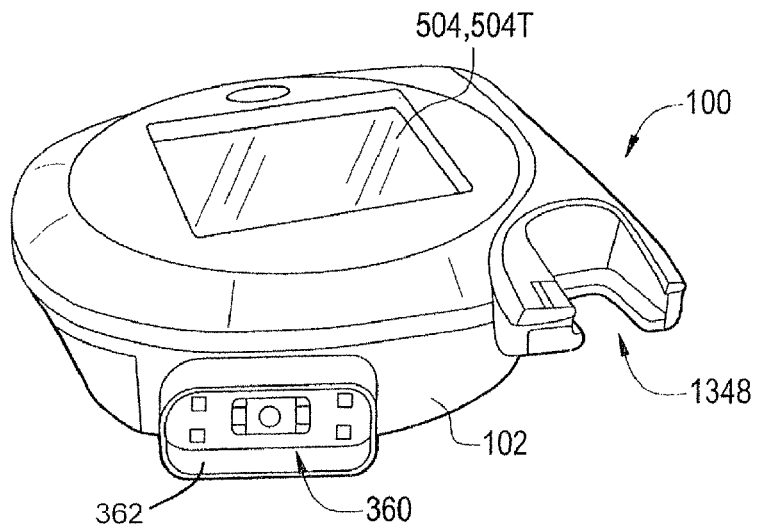
FIGS. 7a-7c illustrate an exemplary portable and re-mountable EIR terminal housing.
Figure 7A:
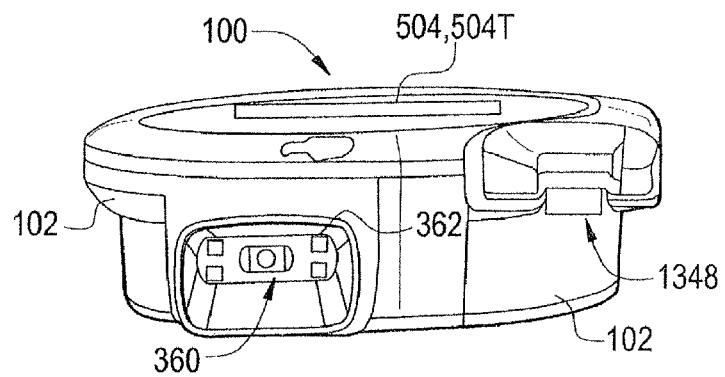
Figure 7C:
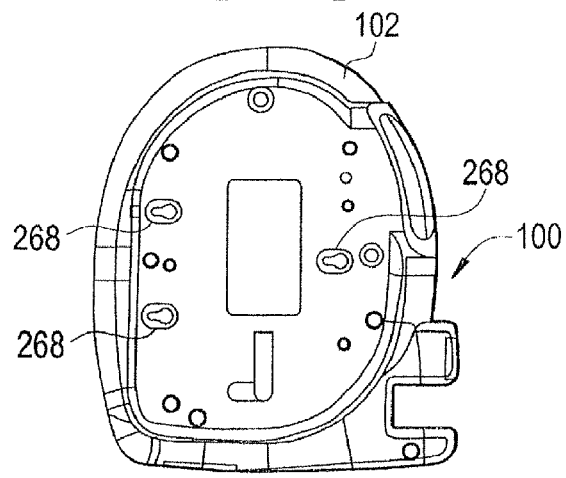
Figure 8A:
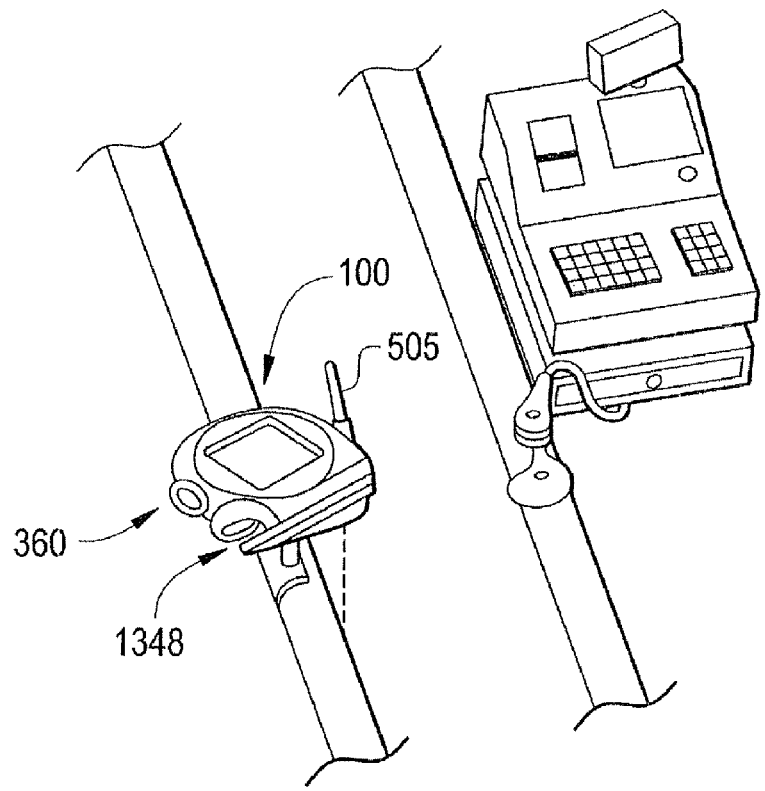
FIG. 8a illustrates a first exemplary deployment of an EIR terminal according to the invention within a retail store.

In the embodiment of FIGS. 7a-7c, the EIR terminal 100 is in the form of a transaction terminal which may be configured as a retail purchase transaction terminal or as a price verifier. Housing 102 of the transaction terminal shown in FIGS. 7a-7c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 8b). Referring to bottom view of FIG. 7c, the housing 102 of the EIR terminal 100 has formations 268 facilitating the replaceable mounting of EIR terminal 100 on a fixed structure. Referring now to FIG. 7b, EIR terminal 100 includes a display 504 having an associated touch screen 504T, a card reader 1348, an imaging module 360, and a luminous shroud 362. When light from an illumination source of imaging module 360 strikes luminous shroud 362, the shroud glows to attract attention to the location of imaging assembly. In certain operating modes as indicated in FIG. 8c, the EIR terminal 100 in accordance with any of FIGS. 7a-7c, displays on display 504 a PIN entry screen prompting a customer to enter PIN information into touch screen 504T. In other operating modes, as indicated in FIG. 8d, the EIR terminal 100 displays on display 504 a signature prompt screen prompting a customer to enter signature information into the device with use of a stylus 505 (shown in FIG. 8a).

Figure 8B:
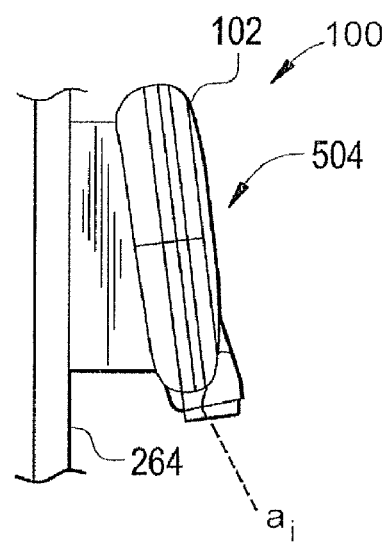
FIG. 8b illustrates a second exemplary deployment of an EIR terminal according to the invention within a retail store.

Referring to FIGS. 8a and 8b, various installation configurations for the EIR terminal 100 of FIGS. 7a-7c are shown. In the view of FIG. 8a, the EIR terminal 100 is installed as a retail purchase transaction terminal at a point of sale cashier station. In the setup of FIG. 8a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 8b, the EIR terminal 100 is configured as a price verifier to aid customers in checking prices of products located on a store floor. EIR terminal 100 may be mounted on a shelf (not shown in FIG. 8b) or on a column 264 or other fixed structure of the retail store. EIR terminal 100 may decode bar code data from bar codes on store products and transmit decoded out bar code messages to a store server for lookup of price information which is sent back from the store server to terminal 100 for display on display 504.

A small sample of systems methods and apparatus that are described herein is as follows:

A1. An encoded information reading (EIR) terminal comprising:
  a central processing unit (CPU);
  a memory communicatively coupled to said CPU;
  an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and
  a wireless communication interface communicatively coupled to said CPU, said wireless communication interface comprising a first logical communication interface operating on a first frequency channel and a second logical communication interface operating on a second frequency channel;
  wherein said wireless communication interface is configured to transmit infrastructure mode beacons on said first frequency channel, said infrastructure mode beacons including a service set identifier;
  wherein said wireless communication interface is further configured to transmit ad-hoc mode beacons on said second frequency channel, said ad-hoc mode beacons including an identifier of a mesh path selection protocol; and
  wherein said EIR terminal is further configured to route MAC frames between said first logical communication interface and said second logical communication interface.

A2. The EIR terminal of claim A1, wherein said first frequency channel and said second frequency channel are provided by a single frequency channel.

A3. The EIR terminal of claim A1, wherein said first logical communication interface and said second logical communication interface are provided by a single communication interface.

A4. The EIR terminal of claim A1, wherein said EIR terminal comprises at least two logical communication interfaces.

A5. The EIR terminal of claim A1, wherein said EIR terminal is configured to transmit and receive MAC frames to and from at least one IEEE 802.11-conformant wireless station using said first logical communication interface; and wherein EIR terminal is further configured to transmit and receive MAC frames to and from at least one IEEE 802.11s-conformant mesh point using said second logical communication interface.

A6. The EIR terminal of claim A1, wherein said EIR terminal is configured to transmit and receive MAC frames to and from at least one IEEE 802.11-conformant wireless access point using said first logical communication interface; and wherein EIR terminal is further configured to transmit and receive MAC frames to and from at least one IEEE 802.11s-conformant mesh point using said second logical communication interface.

A7. The EIR terminal of claim A1, wherein said EIR terminal is configured to perform IEEE 802.11-conformant wireless distribution system services including association, disassociation, distribution, integration, and re-association.

A8. The EIR terminal of claim A1, wherein said first logical communication interface is associated with a first MAC address;

wherein said second logical communication interface is associated with a second MAC address; and wherein said EIR terminal is configured to perform data link layer routing between said at least two logical communication interfaces.

A9. The EIR terminal of claim A1, wherein said first logical communication interface is associated with a first IP address; wherein said second logical communication interface is associated with a second IP address; and wherein said EIR terminal is configured to perform network layer routing between said at least two logical communication interfaces.

B1. An encoded information reading (EIR) terminal comprising:
- a central processing unit (CPU);
- a memory communicatively coupled to said CPU;
- an encoded information reading (EIR) device selected from the group consisting of a bar code reading device, an RFID reading device, and a card reading device, said EIR device configured to perform one of: outputting raw message data including an encoded message, outputting decoded message data corresponding to an encoded message; and
- a wireless communication interface communicatively coupled to said CPU, said wireless communication interface configured to transmit beacons, each of said beacons including a service set identifier and an identifier of a mesh path selection protocol.

B2. The EIR terminal of claim B1, wherein said wireless communication interface is configured to transmit and receive MAC frames to and from at least one IEEE 802.11-conformant wireless station using an infrastructure mode; and wherein said wireless communication interface is further configured to transmit and receive MAC frames to and from at least one IEEE 802.11s-conformant mesh point using an ad-hoc mode.

B3. The EIR terminal of claim B1, wherein said wireless communication interface is configured to perform IEEE 802.11-conformant wireless distribution system services including association, disassociation, distribution, integration, and re-association.

B4. The EIR terminal of claim B1, wherein said wireless communication interface includes at least two logical communication interfaces, each of said logical communication interfaces associated with a MAC addresses; and wherein said EIR terminal is configured to perform data link layer routing between said at least two logical communication interfaces.

B5. The EIR terminal of claim B1, wherein said wireless communication interface includes at least two logical communication interfaces, each of said logical communication interfaces associated with an IP addresses; and wherein said EIR terminal is configured to perform network layer routing between said at least two logical communication interfaces.

C1. An encoded information reading (EIR) terminal comprising:
- a central processing unit (CPU);
- a memory communicatively coupled to said CPU;
- an encoded information reading (EIR) device selected from the group consisting of a bar code reading device, an RFID reading device, and a card reading device, said EIR device configured to perform one of: outputting raw message data including an encoded message, outputting decoded message data corresponding to an encoded message; and
- a wireless communication interface communicatively coupled to said CPU, said wireless communication interface configured to communicate using an infrastructure mode to at least one of: a first IEEE 802.11-conformant wireless station, a wireless access point configured to provide distribution services, and a wireless portal configured to provide integration services;

wherein said wireless communication interface is further configured to communicate using an ad-hoc mode to at least one IEEE 802.11-conformant wireless station; and wherein said wireless communication interface is further configured to route MAC frames received from said at least one IEEE 802.11-conformant wireless station to at least one of: a second IEEE 802.11-conformant wireless station, said wireless access point, said wireless portal.

C2. The EIR terminal of claim C1, wherein said wireless communication interface comprises at least two logical communication interfaces including a first logical communication interface operating on a first frequency channel and a second logical communication interface operating on a second frequency channel.

C3. The EIR terminal of claim C1, wherein said wireless communication interface comprises at least two logical communication interfaces operating on a single frequency channel.

C4. The EIR terminal of claim C1, wherein said wireless communication interface is configured to perform IEEE 802.11-conformant wireless station services including authentication, de-authentication, privacy, and MAC service data unit delivery.

C5. The EIR terminal of claim C1, wherein said wireless communication interface includes at least two logical communication interfaces, each of said logical communication interfaces associated with a MAC addresses; and wherein said EIR terminal is configured to perform data link layer routing between said at least two logical communication interfaces.

C6. The EIR terminal of claim C1, wherein said wireless communication interface includes at least two logical communication interfaces, each of said logical communication interfaces associated with an IP addresses; and wherein said EIR terminal is configured to perform network layer routing between said at least two logical communication interfaces.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

The invention claimed is:

1. An encoded information reading (EIR) terminal comprising:
- a central processing unit (CPU);
- a memory communicatively coupled to said CPU;
- an encoded information reading (EIR) device selected from the group consisting of a bar code reading device, an RFID reading device, and a card reading device, said EIR device configured to perform one of: outputting raw message data containing an encoded message, outputting decoded message data corresponding to an encoded message; and
- a wireless communication interface communicatively coupled to said CPU, said wireless communication interface comprising a first logical communication interface operating on a first frequency channel and a second logical communication interface operating on a second frequency channel;

wherein said wireless communication interface is configured to transmit infrastructure mode beacons on said first frequency channel, said infrastructure mode beacons including a service set identifier;

wherein said wireless communication interface is further configured to transmit ad-hoc mode beacons on said second frequency channel, said ad-hoc mode beacons including an identifier of a mesh path selection protocol; and wherein said EIR terminal is further configured to route MAC frames between said first logical communication interface and said second logical communication interface.

2. The EIR terminal of claim 1, wherein said first frequency channel and said second frequency channel are provided by a single frequency channel.

3. The EIR terminal of claim 1, wherein said first logical communication interface and said second logical communication interface are provided by a single communication interface.

4. The EIR terminal of claim 1, wherein said EIR terminal comprises at least two logical communication interfaces.

5. The EIR terminal of claim 1, wherein said EIR terminal is configured to transmit and receive MAC frames to and from at least one IEEE 802.11-conformant wireless station using said first logical communication interface; and wherein EIR terminal is further configured to transmit and receive MAC frames to and from at least one IEEE 802.11s-conformant mesh point using said second logical communication interface.

6. The EIR terminal of claim 1, wherein said EIR terminal is configured to transmit and receive MAC frames to and from at least one IEEE 802.11-conformant wireless access point using said first logical communication interface; and wherein EIR terminal is further configured to transmit and receive MAC frames to and from at least one IEEE 802.11s-conformant mesh point using said second logical communication interface.

7. The EIR terminal of claim 1, wherein said EIR terminal is configured to perform IEEE 802.11-conformant wireless distribution system services including association, disassociation, distribution, integration, and re-association.

8. The EIR terminal of claim 1, wherein said first logical communication interface is associated with a first MAC address;

wherein said second logical communication interface is associated with a second MAC address; and wherein said EIR terminal is configured to perform data link layer routing between said first logical communication interface and said second logical communication interface.

9. The EIR terminal of claim 1, wherein said first logical communication interface is associated with a first IP address; wherein said second logical communication interface is associated with a second IP address; and wherein said EIR terminal is configured to perform network layer routing between said first logical communication interface and said second logical communication interface.

10. An encoded information reading (EIR) terminal comprising:
a central processing unit (CPU);
a memory communicatively coupled to said CPU;
an encoded information reading (EIR) device selected from the group consisting of a bar code reading device, an RFID reading device, and a card reading device, said EIR device configured to perform one of: outputting raw message data including an encoded message, outputting decoded message data corresponding to an encoded message; and
a wireless communication interface communicatively coupled to said CPU, said wireless communication interface configured to transmit beacons, each of said beacons including a service set identifier and an identifier of a mesh path selection protocol.

11. The EIR terminal of claim 10, wherein said wireless communication interface is configured to transmit and receive MAC frames to and from at least one IEEE 802.11-conformant wireless station using an infrastructure mode; and wherein said wireless communication interface is further configured to transmit and receive MAC frames to and from at least one IEEE 802.11s-conformant mesh point using an ad-hoc mode.

12. The EIR terminal of claim 10, wherein said wireless communication interface is configured to perform IEEE 802.11-conformant wireless distribution system services including association, disassociation, distribution, integration, and re-association.

13. The EIR terminal of claim 10, wherein said wireless communication interface includes at least two logical communication interfaces, each of said logical communication interfaces associated with a MAC addresses; and wherein said EIR terminal is configured to perform data link layer routing between said at least two logical communication interfaces.

14. The EIR terminal of claim 10, wherein said wireless communication interface includes at least two logical communication interfaces, each of said logical communication interfaces associated with an IP addresses; and wherein said EIR terminal is configured to perform network layer routing between said at least two logical communication interfaces.

15. An encoded information reading (EIR) terminal comprising:
a central processing unit (CPU);
a memory communicatively coupled to said CPU;
an encoded information reading (EIR) device selected from the group consisting of a bar code reading device, an RFID reading device, and a card reading device, said EIR device configured to perform one of: outputting raw message data including an encoded message, outputting decoded message data corresponding to an encoded message; and
a wireless communication interface communicatively coupled to said CPU, said wireless communication interface including at least two logical communication interfaces, said wireless communication interface configured to communicate using an infrastructure mode to at least one of: a first IEEE 802.11-conformant wireless station, a wireless access point configured to provide distribution services, and a wireless portal configured to provide integration services;
wherein said wireless communication interface is further configured to communicate using an ad-hoc mode to at least one IEEE 802.11-conformant wireless station; and
wherein said wireless communication interface is further configured to route MAC frames received from said at least one IEEE 802.11-conformant wireless station to at least one of: a second IEEE 802.11-conformant wireless station, said wireless access point, said wireless portal.

16. The EIR terminal of claim 15, wherein said at least two logical communication interfaces including include a first logical communication interface operating on a first frequency channel and a second logical communication interface operating on a second frequency channel.

17. The EIR terminal of claim 15, wherein said at least two logical communication interfaces operate on a single frequency channel.

18. The EIR terminal of claim 15, wherein said wireless communication interface is configured to perform IEEE 802.11-conformant wireless station services including authentication, de-authentication, privacy, and MAC service data unit delivery.

19. The EIR terminal of claim 15, wherein each of said at least two logical communication interfaces is associated with a MAC addresses; and wherein said EIR terminal is configured to perform data link layer routing between said at least two logical communication interfaces.

20. The EIR terminal of claim 15, wherein each of said at least two logical communication interfaces is associated with an IP addresses; and wherein said EIR terminal is configured to perform network layer routing between said at least two logical communication interfaces.

* * * * *

UNITED STATES PATENT AND TRADEMARK OFFICE
CERTIFICATE OF CORRECTION

PATENT NO.        : 8,191,785 B2                               Page 1 of 1
APPLICATION NO.   : 12/398401
DATED             : June 5, 2012
INVENTOR(S)       : Qu et al.

It is certified that error appears in the above-identified patent and that said Letters Patent is hereby corrected as shown below:

Column 12, Line 64: Claim 16, Delete "including"

Signed and Sealed this
Twenty-fourth Day of July, 2012

David J. Kappos
*Director of the United States Patent and Trademark Office*